Figure 1:
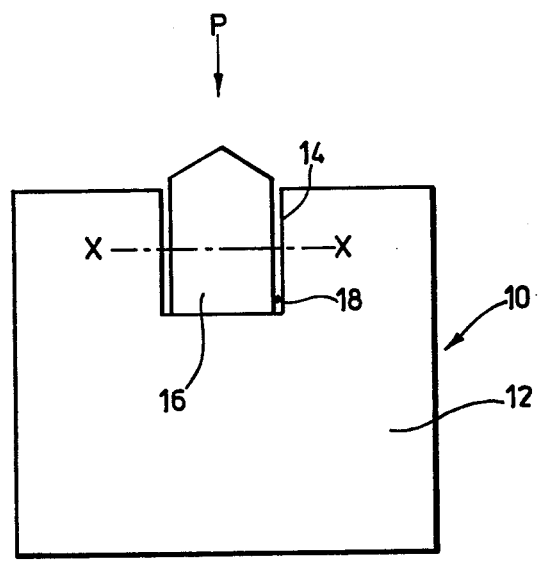

United States Patent [19]

Sloboda et al.

[11] 4,049,434

[45] Sept. 20, 1977

[54] BRAZING ALLOY

[75] Inventors: Mieczyslaw Herman Sloboda; John Sidney Hatswell, both of London, England

[73] Assignee: Johnson, Matthey & Co., Limited, London, England

[21] Appl. No.: 729,720

[22] Filed: Oct. 5, 1976

Related U.S. Application Data

[63] Continuation of Ser. No. 542,865, Jan. 21, 1975, abandoned.

[30] Foreign Application Priority Data

Jan. 24, 1974   United Kingdom ................. 3343/74

[51] Int. Cl.$^2$ .......................... C22C 9/04; C22C 30/02
[52] U.S. Cl. ................................... 75/134 C; 75/157.5
[58] Field of Search ................... 75/134 C, 157.5, 153, 75/159, 161

[56] References Cited

U.S. PATENT DOCUMENTS

| | | | |
|---|---|---|---|
| 2,079,411 | 5/1937 | Jennison | 75/157.5 |
| 2,126,827 | 8/1938 | Smith | 75/157.5 X |
| 2,141,156 | 12/1938 | Peterson | 75/157.5 |
| 2,144,993 | 1/1939 | Muller et al. | 75/157.5 |
| 2,279,284 | 4/1942 | Wassermann | 75/157.5 |
| 2,777,767 | 1/1957 | Leston | 75/157.5 |
| 3,693,246 | 9/1972 | Novikov et al. | 75/134 C |

FOREIGN PATENT DOCUMENTS

| | | | |
|---|---|---|---|
| 1,792 of | 1861 | United Kingdom | 75/134 C |
| 323,227 | 7/1971 | U.S.S.R. | 75/157.5 |

*Primary Examiner*—L. Dewayne Rutledge
*Assistant Examiner*—E. L. Weise
*Attorney, Agent, or Firm*—Cushman, Darby & Cushman

[57] ABSTRACT

This invention relates to brazing alloys suitable for use in the fabrication of cutting tools, for example, the brazing of a cutting tip to a shank of a rock drill.

One particular brazing alloy in accordance with the invention comprises, apart from impurities, 15–40 wt.% zinc, 15–45 wt.% silver, 0.2–15 wt.% manganese, 0.2–10 wt.% nickel and balance copper.

2 Claims, 2 Drawing Figures

U.S. Patent  Sept. 20, 1977  4,049,434

BRAZING ALLOY

This is a continuation, of application Ser. No. 542,865 filed Jan. 21, 1975, now abandoned.

This invention relates to alloys and especially to brazing alloys.

It is an object of this invention to provide a brazing alloy for use in the fabrication of cutting tools, for example, the brazing of a cutting tip or cutting insert on to a shank of a rock drill.

A brazing alloy for use in forming a brazed joint between the shank and cutting tip of a rock drill should ideally possess the ability to wet steel (the shank material) and a cobalt-bonded tungsten carbide (the cutting tip material) as well as being metallurgically compatible with these materials. A brazing alloy should be of relatively low intrinsic cost and have the ability to be fabricated in the form of a wire and strip by standard production methods. A brazing alloy should also possess a relatively high plasticity in a temperature range between the solidus of the brazing alloy and, say, 300° C. This plasticity feature reduces the risk of cracking which tends to occur in large size drills during cooling due to the widely differing contraction characteristics of steel and tungsten carbides. Further, a brazing alloy should have a sufficiently high strength at room temperature, for example, a U.T.S. of 20–30 tons/square inch, to reduce the risk of premature failure of a drill due to fatigue of the brazed joint between the shank and the tip.

According to the invention a silver-containing brazing alloy comprises, apart from impurities, 15–40 wt.% zinc, 15–45 wt.% silver, 0.2–15 wt.% manganese, 0.2–10 wt.% nickel and balance copper. Preferably, the silver-containing alloy contains 33 wt.% zinc, 25 wt.% silver, 2 wt.% manganese, 2 wt.% nickel, 38 wt.% copper and melts within a temperature range of 710–810° C.

The alloy according to the invention may be modified by excluding silver from its composition, increasing the copper and zinc contents, and adding a small percentage of cobalt to produce a silver-free brazing alloy comprising, apart from impurities, 10–45 wt.% zinc, 0.2–15 wt.% manganese, 0.2–10 wt.% manganese, 0.2–10 wt.% cobalt, optionally 0.2–10 wt.% nickel, and balance copper. Preferably, the non-silver-containing alloy contains, apart from impurities, 38 wt.% zinc, 2 wt.% manganese, 2 wt.% cobalt and 58 wt.% copper, and melts within a temperature range of 890–930° C.

Reference has been made above to reducing the risk of cracking in brazed joints in carbide-tipped tools. This risk increases in proportion to the joint length which governs the magnitude of stresses produced by the differential contraction of the various materials present, namely, steel (the dril shank), the brazing alloy, and tungsten carbide (the cutting tip).

Figure 2:
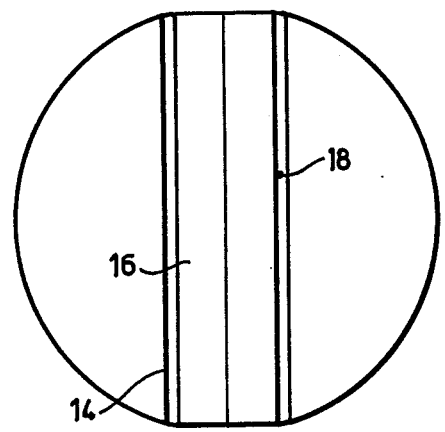

The invention will be hereinafter more fully described with reference to the accompanying drawing in which:

FIG. 1 shows a side elevation of a drill fitted with a tungsten carbide insert, and FIG. 2 shows an end view of the drill seen in the direction of the arrow P of FIG. 1.

As shown in the drawing, the drill 10 comprises a steel shank 12 formed at one end with a rectangular groove 14 in which is inserted a tungsten carbide tip 16, the groove being dimensioned to provide a narrow gap 18 for receiving the brazing alloy forming the joint.

Brazing tests were carried out on rock drills with carbide tips 1.75 inch long (which is almost the maximum size used in industry) of the type shown in FIG. 1.

Another factor affecting the risk of cracking is the joint gap width, rock drills with wider joint gaps being generally less susceptible to cracking under the influence of stresses due to differntial contraction. The width of the joint gap is quite an important factor and, generally speaking, the minimum admissible joint gap, that is, the smallest gap ensuring the freedom from crack formation during the cooling cycle of a brazing operation, varies depending on the length of the carbide insert 16, the composition of the steel shank 12 and on the cooling site after brazing.

The nominal joint gap in all the experimental rock drills brazed during this investigation was 0.004 inch. This figure is near the lower limit of the joint gap range recommended for, and used in such brazed joints, and experience has shown that such a gap is sufficiently small to promote cracking of joints with unsuitable alloys.

Each brazing test was carried out under conditions simulating the brazing cycle currently used in the maufacture of rock drills. In this procedure the brazing operation is combined with the heat treatment of the steel shank. This is done by heating the workpiece to the brazing temperature, cooling or heating it (as necessary) depending on the melting point of the alloy, to 850° C, transferring it to an oven at 350° C, holding it at 350° C for one hour, and then cooling it in air to room temperature.

To ascertain that tests carried out under the conditions chosen would provide a reliable means of revealing the potential usefulness of the alloys tested, a preliminary series of experiments was carried out with a Cu-2.5 Ni-0.6% Si alloy referred to as "A" Bronze, known to produce joints susceptible to cracking and with a ductile alloy Cu-3%Ni referred to as "B" Bronze, known to produce crack-free joints (but not used in the manufacture of rock drills because of its low strength). Extensive cracks were, in fact, formed in joints made with A Bronze whereas little or no evidence of cracking was found in joints made with B Bronze. This was regarded as a sufficient proof of the reliability of the test.

Medium-frequency heating was used for brazing. Sufficient brazing alloy to form the joint was placed at the bottom of a wall of the groove formed in the steel shank of the rock drill. A coat of Tenacity No. 5 Flux paste was next applied to the joint area which was then sprinkled with a liberal quantity of boric oxide to increase the stability of the flux at elevated temperatures. Asbestos tape was wrapped round the drill to contain the molten flux in the joint gap.

The compositions of the alloys tested included various combinations of the constituents zinc, silver, manganese, nickel, cobalt, copper and silicon. Zinc and silver were used as melting point depressants; manganese was added to improve the wetting characteristics of the alloys on tungsten carbide; nickel and cobalt were introduced to act as hardeners to improve the joint filling properties of the alloys and to reduce the extent of erosion of tungsten carbide by molten brazing alloys, whilst silicon was added to improve the wettability and the flow characteristics of the alloys.

Typical of the large number of alloys tested are those referred to in Table 1 as Alloys Nos. 1 - 4.

The melting ranges of the alloys tested were determined by spreading tests carried out in a continuous brazing furnace at temperatures progressively increasing in steps of 20° C.

The hardness of the alloys (in the as-cast condition and after a heat treatment simulating the brazing cycle) was measured to get a rough estimate of their relative strength.

Visual examination alone of joints in brazed rock drill specimens could not be relied on to determine the presence or the extent of cracking except in the case of large open cracks visible on both the vertical and horizontal joint faces. In other cases there was a possiblity of hair cracks being concealed as a result of the cleaning operation (sand blasting), or of surface defects (e.g., solidification shrinkage) being mistaken for cracks. It was, therefore, necessary to section the specimens for examination in the plane indicated by X — X in FIG. 1. The results of the examination of specimens brazed with four of the alloys tested are given in Table 1.

From the results given in this Table it will be seen that neither of the alloys referred to as Nos. 1 and 2 produced crack-free joints under the experimental conditions used in this investigation. Similar results were obtained with all the other alloys tested apart from alloys according to this invention. These latter are exemplified by alloys Nos. 3 and 4 and gave very satisfactory results. The nominal compositions of alloys 3 and 4 as given in the table were:

68Cu-38Zn-2-Mn-2Co——(Melting range:890°–930° C);

38Cu-33Zn-25Ag-2Mn-2Ni——(Melting range:710–810° C)

Kilogram quantities of these alloys were made as 3 mm diameter wire and 1 mm and 3 mm thick sheet. The materials were fabricated without any difficulties by conventional methods (hot rolling followed by cold rolling and annealing) and further evaluation has shown them to be satisfactory brazing alloys.

TABLE 1

Extent of Cracking of Joints made in Rock Drill Specimens with Various Brazing Alloys

| Alloy No. | Composition % | | | | | | | | |
|---|---|---|---|---|---|---|---|---|---|
| | Cr | Mn | Ni | Co | Fe | Zn | Cu | Other | Examination of Cross-section |
| 1 | 1.5 | 8 | 5 | | 5 | 20 | 60.5 | | Cracks in the braze |
| 2 | | | 5 | | | 39 | 55.9 | 0.1%Si | Cracks in braze/steel interface and in braze |
| 3 | | 2 | | 2 | | 38 | 58 | | No cracks |
| 4 | | 2 | 2 | | | 33 | 38 | 25%Ag | No cracks |

What we claim is:

1. A brazing alloy consisting essentially of 33 wt.% zinc, 25 wt.% silver, 2wt.% manganese, 2 wt.% nickel and 38 wt.% copper, said alloy melting in the range 710–810° C and being characterized by its resistance to cracking on cooling when used to braze the joint between a steel shank and carbide cutting tip of a rock drill.

2. A brazing alloy consisting essentially of 38 wt.% zinc, 2 wt.% manganese, 2 wt.% cobalt and 58 wt.% copper, said alloy melting in the range 890°–930° C and being characterized by its resistance to cracking on cooling when used to braze the joint between a steel shank and carbide cutting tip of a rock drill.

* * * * *